(12) United States Patent
Wong (10) Patent No.: US 9,961,172 B1
(45) Date of Patent: May 1, 2018

(54) ELECTRONIC MODULE AND MODULAR ELECTRONIC DEVICE WITH IMPROVED ENGAGEMENT FEATURES

(71) Applicant: Google Inc., Mountain View, CA (US)

(72) Inventor: Jason Cinge Wong, Millbrae, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/597,800

(22) Filed: May 17, 2017

Related U.S. Application Data (60) Provisional application No. 62/337,570, filed on May 17, 2016.

(51) Int. Cl.
  *H04B 1/38* (2015.01)
  *H04M 1/02* (2006.01)
(52) U.S. Cl.
  CPC ....... *H04M 1/0252* (2013.01); *H04M 1/0274* (2013.01)

(58) Field of Classification Search
  CPC ......... H04B 1/38; H04B 1/3816; H04M 1/02; H04M 1/0254; H04M 1/725
  See application file for complete search history.

(56) References Cited

U.S. PATENT DOCUMENTS

| | | | | |
|---|---|---|---|---|
| 3,511,385 | A * | 5/1970 | Ayling | H05K 7/1425 211/41.17 |
| 6,959,084 | B1 * | 10/2005 | DeCraene | H04M 19/00 379/413.02 |
| 7,072,191 | B2 * | 7/2006 | Nakao | H02M 3/156 323/282 |
| 9,319,529 | B2 * | 4/2016 | Tregenza Dancer | H04M 5/08 |
| 9,591,113 | B2 * | 3/2017 | Filser | H04M 1/0254 |

* cited by examiner

*Primary Examiner* — Blane Jackson
(74) *Attorney, Agent, or Firm* — Dority & Manning, P.A.

(57) ABSTRACT

An electronic module for a modular electronic device may include improved features for retaining the electronic module relative to a frame of the modular electronic device and/or for subsequently removing such module from the frame.

19 Claims, 7 Drawing Sheets

ELECTRONIC MODULE AND MODULAR ELECTRONIC DEVICE WITH IMPROVED ENGAGEMENT FEATURES

PRIORITY CLAIM

The present application claims the benefit of priority of U.S. Provisional Application Ser. No. 62/337,570, entitled "Electronic Module and Modular Electronic Device with Improved Engagement Features," filed on May 17, 2016, which is incorporated herein by reference.

FIELD

The present subject matter relates generally to improved features for retaining electronic modules relative to a frame of a modular electronic device and/or for subsequently removing such modules from the frame.

BACKGROUND

Smartphones and other portable electronic devices have become increasingly popular over the past several years. In a competitive market, continuous improvements and enhancements must be made to portable electronic devices to satisfy the increasing consumer demands and expectations regarding the performance and/or functionality of such devices. Recently, attempts have been made to develop a modular electronic device including interchangeable modules designed to be installed onto and removed from the device to provide increased flexibility with respect to performance and/or functionality. In doing so, it is has been recognized that consumers desire to be able to install and remove the modules quickly and easily from the device without significant effort.

SUMMARY

Aspects and advantages of embodiments of the invention will be set forth in part in the following description, or may be obvious from the description, or may be learned through practice of the embodiments.

In one aspect, the present subject matter is directed to a modular electronic device. The modular electronic device can include a frame defining one or more bays. The frame can be adapted to respectively receive an electronic module in at least one of the bays. The modular electronic device can further include a connector associated with the frame. The connector can be configured to engage with the electronic module to secure at least a portion of the electronic module to the frame.

In another aspect, the present subject matter is directed to an electronic module. The electronic module can include a module housing that includes a first end and a second end. The electronic module can further include an engagement member that can be provided on a portion of the module housing associated with the second end. The engagement member can be configured to engage with a frame of a modular electronic device to secure at least the portion of the electronic module to the module device.

In a further aspect, the present subject matter is directed to an electronic modular device. The electronic modular device can include a frame defining one or more bays. The frame can be adapted to respectively receive an electronic module in at least one of the bays. The electronic modular device can further include a connector associated with the frame. The connector can be configured to engage with the electronic module to secure at least a portion of the electronic module to the connector. The electronic modular device can include an electronic module. The electronic module can include a module housing that includes a first end and a second end and an engagement member that is provided on a portion of the module housing associated with the second end. The engagement member can be configured to engage with the connector to secure at least the portion of the electronic module to the frame.

Other exemplary aspects of the present disclosure may be directed to other modular electronic devices, electronic modules, systems, methods, apparatus, non-transitory computer-readable media, user interfaces and/or the like.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation. In fact, it will be apparent to those skilled in the art that various modifications and variations can be made to the embodiments without departing from the scope or spirit of the embodiments. For instance, features illustrated or described as part of one embodiment can be used with another embodiment to yield a still further embodiment. Thus, it is intended that the present subject matter cover such modifications and variations as come within the scope of the appended claims and their equivalents.

Example aspects of the present disclosure are directed to mechanisms for attaching and/or removing an electronic module to a modular electronic device. For instance, a modular electronic device can include a frame defining one or more bays. The frame can be adapted to respectively receive an electronic module (e.g., a speaker module, battery module, camera module) at each of the one or more bays. The electronic modular device can include various mechanisms for attaching and/or retaining an electronic module. The electronic module intended for placement within a first bay of the electronic modular device can include a module housing with a first end and a second end. In some implementations, the modular electronic device can include a retention member associated with the frame (e.g., situated within the first bay). The retention member can be configured to engage the electronic module to couple a first portion associated with the first end of the electronic module to the frame. Additionally, and/or alternatively, the modular electronic device can include a connector associated with the frame (e.g., situated within the first bay) and configured to engage with the electronic module to couple a second portion associated with the second end of the electronic module to the frame.

An electronic module intended for placement within the first bay of the electronic modular device can include a release member that is configured to releaseably engage the retention member and an engagement member (e.g., a protrusion) that snaps into a cavity of the connector situated within the bay. Engagement of the release member to the retention member can couple the first portion of the electronic module to the frame. Engagement of the engagement member and the cavity of the connector can couple the second portion of the electronic module to the frame. The shape of the engagement member (e.g., half-dimple shape) can be formed to limit movement of the electronic module (e.g., in a direction orthogonal to the frame) while engaged with the cavity, but to allow movement in a lateral direction (out of the cavity) upon ejection and removal. Upon ejection of the first portion (e.g., release of the engagement of the release member to the retention member), the electronic module can pivot about the engagement member for easy removal of the electronic module, as further described herein.

In this way, the design of the engagement member can allow for the electronic module to be retained upon initial release of one portion of the module. The electronic module can be retained, even during an upside-down movement of the frame while the first portion is disengaged from the retention member. When a user peels the electronic module up for removal, the module can release, as described herein, and can be effortlessly pulled out by the user. This feature can be transparent enough that most users will not be aware of what is happening, rather, the user can simply pull up/peel out the electronic module for removal.

Figure 1:
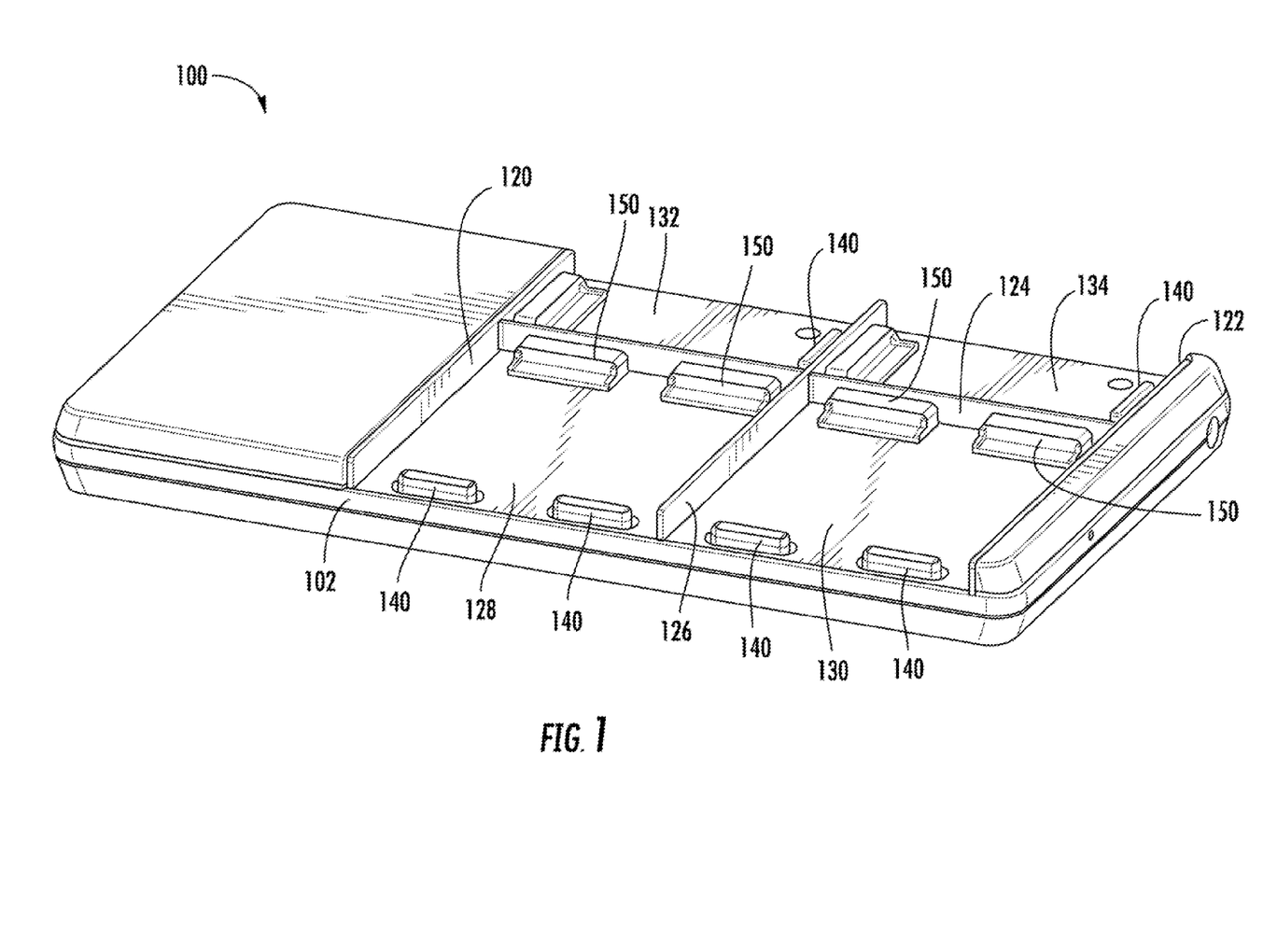
FIG. 1 depicts a rear view of an example modular electronic device according to example embodiments of the present disclosure.

With reference now to the FIGS., example embodiments of the present disclosure will be discussed in further detail. FIG. 1 depicts a rear view of an example modular electronic device 100 according to example embodiments of the present disclosure. As shown, the modular electronic device 100 can include a frame 102. The frame 102 can include any number of protrusions or walls extending outwardly from its rear side so as to define and/or form one or more bay(s) for receiving one or more electronic module(s) along the rear side of the device 100. For example, in the illustrated embodiment, the frame 102 can include an upper rear wall 120 extending outwardly from the rear side of the frame 102, a lower rear wall 122 extending outwardly from the rear side of the frame 102, and a transverse rear wall 124 extending outwardly from the rear side of the frame 102 so as to extend lengthwise perpendicularly between the upper and lower rear walls 120, 122. Additionally, and/or alternatively, the frame 102 can include one or more intermediate rear wall(s) 126 extending outwardly from the rear side of the frame 102 at locations between the upper and lower rear walls 120, 122. In some implementations, the intermediate rear wall(s) 126 can extend lengthwise between an outer perimeter of the frame 102 and the transverse rear wall 124.

Such walls 120, 122, 124, 126 can define or otherwise form a plurality of bays configured to receive the corresponding electronic modules. For example, in the illustrated embodiment, four separate bays (e.g., a first bay 128, a second bay 130, a third bay 132 and a fourth bay 134) can be defined between the walls 120, 122, 124, 126. In some implementations, the intermediate rear wall 126 can be removed, such that the first bay 128 and the second bay 130 form a single, larger bay. It should be appreciated that the particular shapes, sizes, orientations, numbers, arrangements, and configurations of the bays illustrated in FIG. 1 are simply provided for example purposes only. Those of ordinary skill in the art should readily understand that various different shapes, sizes, orientations, numbers, arrangements, and/or configurations of the bays can be used without deviating from the scope of the present subject matter.

As indicated above, each bay 128, 130, 132, 134 defined along the rear side of the frame 102 can be configured to removably receive a respective electronic module. For example, the frame 102 can include one or more means for retaining each electronic module within its respective bay and/or for releasing such module from its respective bay when desired. For example, as shown in FIG. 1, each bay 128, 130, 132, 134 can include one or more retention member(s) 140 associated therewith that is configured to engage a corresponding release member associated with each electronic module. As such, when installing each module within its respective bay (e.g., 128, 130, 132, 134), at least one portion of the electronic module can be secured within the bay (e.g., 128, 130, 132, 134) by engaging the retention member(s) 140. In some implementations, the retention member 140 can be a fixed retention member extending outwardly from a wall of each bay (e.g., the bottom wall or floor of each bay). For example, the retention member 140 can correspond to a projection or rib extending outwardly from a bay floor that defines one or more open ended retention slots. The retention member 140 can be configured to receive a portion of an electronic module when the module is installed within the bay.

Additionally, and/or alternatively, each of the bays 128, 130, 132, 134 defined along the rear side of the frame 102 can have at least one connector 150. The connector 150 can be configured to engage an electronic module to secure at least a portion of the electronic module to the modular electronic device 100 and/or to allow easy removal of an electronic module by a user. For example, the connector 150 can be configured to couple a portion of the electronic module to the frame, such portion being different than the portion coupled by the retention member 140.

Figure 2:
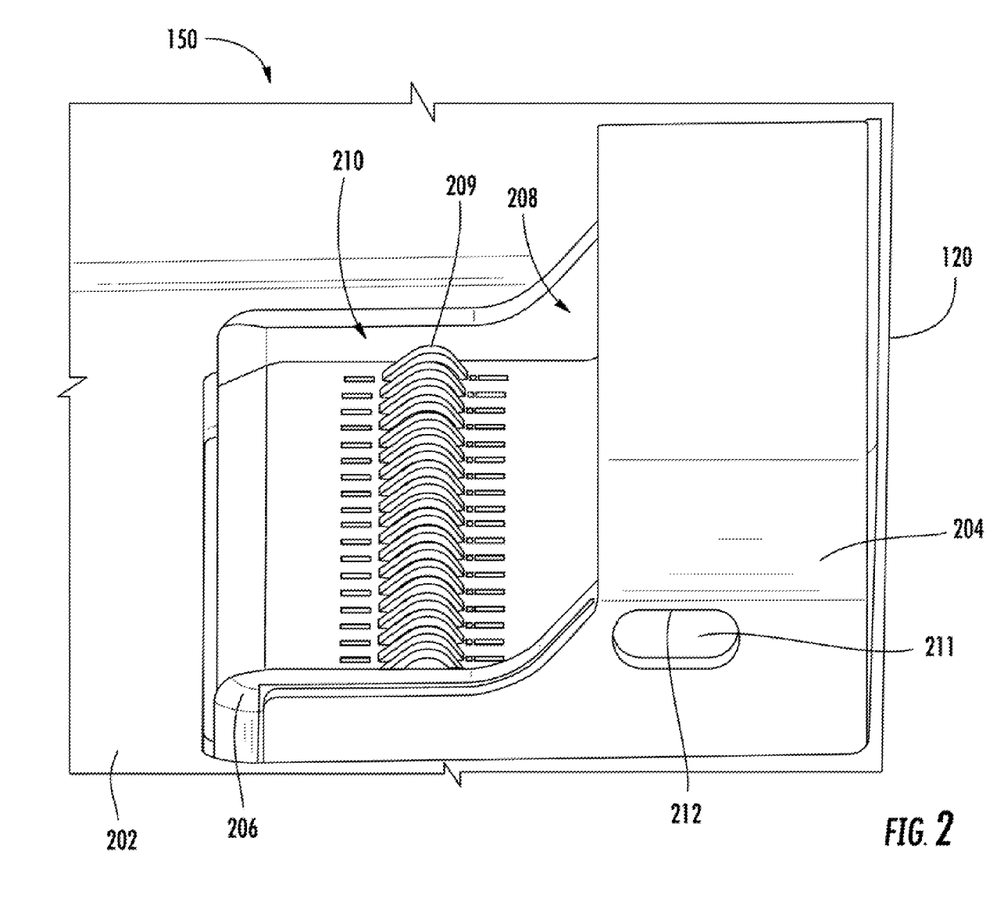
FIG. 2 depicts a perspective view of an example connector according to example embodiments of the present disclosure.

FIG. 2 depicts a perspective view of an example connector 150 according to example embodiments of the present disclosure. The connector 150 can be oriented within any of the bays 128, 130, 132, 134. For illustrative purposes, the connector 150 will be discussed at being positioned within bay 132. For example, the connector 150 can be positioned adjacent to a floor 202 of the bay 132 and at least one wall (e.g., wall 120) defining the bay 132. The connector 150 can include an outer housing 204, which can be temporarily or permanently attached to an inner housing 206. The inner housing 206 can be configured to define an interior 208 of the connector 150. The shape and size of the interior 208 can be configured to fit the size and/or shape of an electronic module that is to engage the connector 150.

In some implementations, the connector 150 can include means for facilitating the removal of an electronic module from the modular device 100. The connector 150 can include one or more element(s) 209 configured to provide a force (e.g., an upward force) to an electronic module, as further described herein. As shown in FIG. 2, the element(s) 209 can include one or more spring-like elements, pins, or any other deformable or compressible element that can be positioned adjacent to an electronic module and can be configured to provide a force on the electronic module in a direction that is generally away from the floor 202 of at least the bay 132 of the frame 102.

The modular electronic device 100 can include means for transferring data and/or power between the modular electronic device 100 and an electronic module. In some implementations, each bay can include such means. For example, the connector 150 can include and/or be associated with one or more data connection interface(s) 210. As illustrated, each data connection interface(s) 210 can include a number of pins, prongs, and/or other elements that permit electric coupling for data and power transfer between the modular electronic device 100 and the electronic module. However, other forms of data couplers can be used in addition and/or alternatively to the illustrated connection interface(s) 210. For example, various ports, pluggable connections, magnetic (e.g., inductive) couplings, or optical couplings can be used between the interface(s) 210 and the corresponding electronic module. It should be appreciated that an electronic module can similarly include a corresponding data connection interface, as further described herein. In some implementations, the data connection interface 210 can be associated with and/or perform the functions of the element(s) 209, or vice versa.

The connector 150 can include means for securing at least a portion of an electronic module to the connector 150. Such means can include, for instance, one or more engagement portion(s) 211 configured to receive an engagement member of an electronic module. For example, the engagement portion 211 can include a slot, opening, hole, cavity, etc. that is configured to receive the engagement member of an electronic module when the electronic module is installed in the bay 132. The engagement portion 211 can include an inner surface 212 which can be configured to contact an engagement member of the electronic module. As shown in FIG. 2, the engagement portion 211 can include an elliptical shape. The shape and size of the engagement portion 211 is not intended to be limiting. The connector 150 can include various shapes and sizes of the engagement portion 211 without deviating from the scope of the present disclosure.

Figure 3:
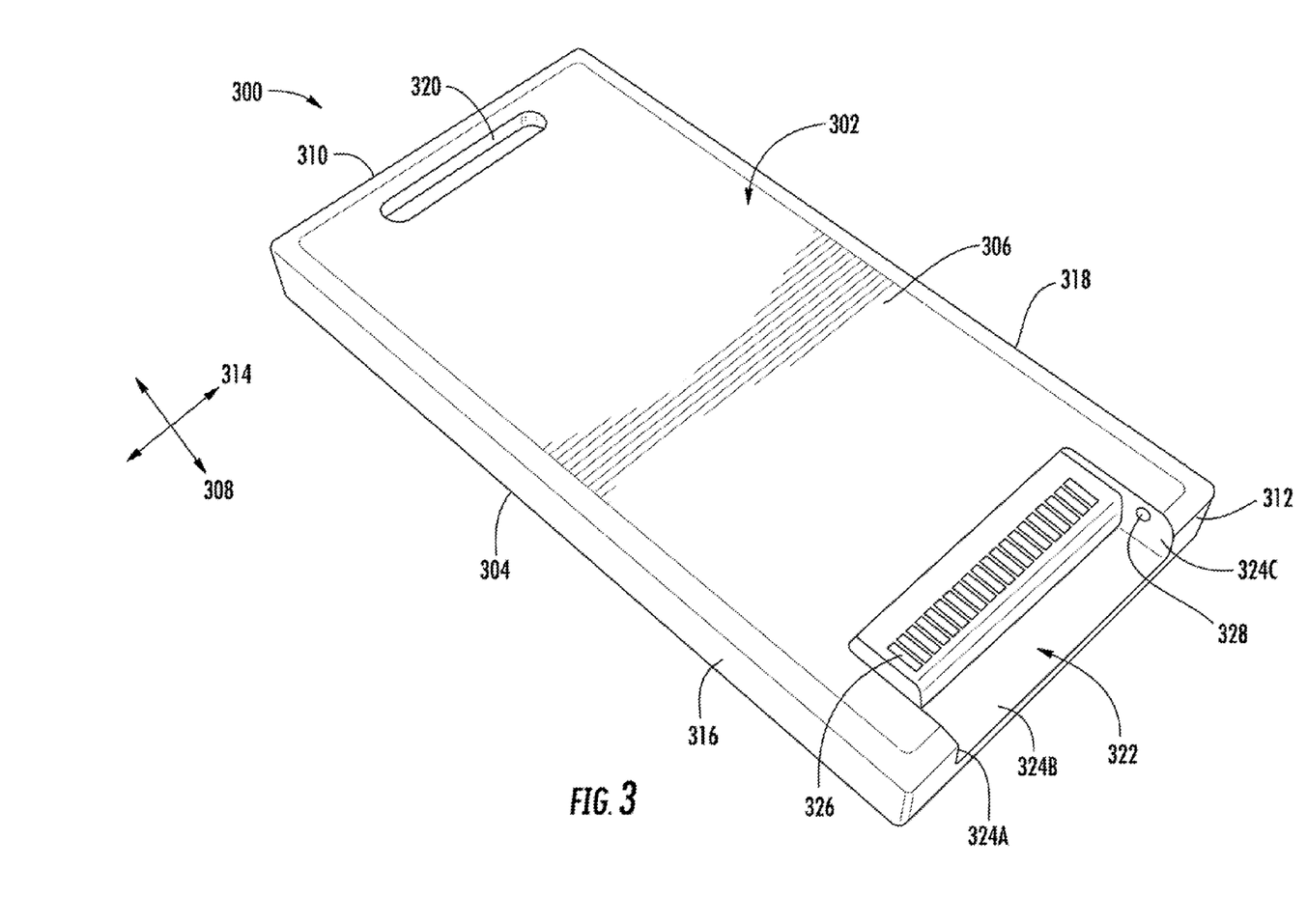
FIG. 3 depicts a perspective view of an example electronic module according to example embodiments of the present disclosure.

FIG. 3 depicts a perspective view of an example electronic module 300 according to example embodiments of the present disclosure. The electronic module 300 can include any module configured and/or suitable for use with the electronic modular device 100. For example, the electronic module 300 can correspond to a speaker module, a camera module, a wireless network interface module (e.g., a Wi-Fi interface module, a cellular data module, or a short-range wireless radio module such as a Bluetooth module), a positioning system module (e.g., a GPS module), a battery module, a USB interface module, a diversity antenna module, and/or various other types of modules and/or combinations thereof. Further, the electronic module 300 may be interchangeable, swappable, and/or otherwise insertable into various different bays. The electronic module 300 can be configured to define a footprint and/or shape that matches the size and shape of a corresponding bay (e.g., bay 132). Additionally, and/or alternatively, electronic module 300 can define any other suitable shape that allows it to be received within a larger bay (e.g., bay 128).

The electronic module 300 can include a module housing 302 forming the outer covering or casing of the electronic module 300. As such, the module housing 302 can be configured to encase and/or enclose the various internal components of the electronic module 300, such as the processor(s), memory, and/or the like. It should be appreciated that the module housing 302 may be formed from various materials (e.g., polymer, metal, etc.) and/or one or more housing components (e.g., shield components).

The module housing 302 may include an upper wall 304 defining an upper surface of the electronic module 300 (e.g., the portion of the outer surface that is visible when the module 300 is installed within its corresponding bay). Similarly, as shown in FIG. 3, the module housing 302 may include a lower wall 306 opposite the upper wall 304 that generally defines a lower surface of the electronic module 300. The upper and lower walls 304, 306 can be generally configured to extend in a lengthwise direction of the electronic module 300 (e.g., as indicated by arrow 308) between a first end 310 and a second end 312. In addition, the upper and lower walls 304, 306 can be generally configured to extend in a widthwise direction of the electronic module 300 (e.g., as indicated by arrow 314) between a first side 316 and a second side 318. The electronic module 300 can be configured to be installed into a bay and/or be securely attached to the electronic modular device 100.

In some implementations, at least one portion of the electronic module 300 can be configured to engage the retention member 140. For instance, a first portion associated with the first end 310 can include means to engage the retention member 140. The electronic module 300 can define an inwardly extending cavity 320 along its exterior that is configured to receive the retention member 140 associated with the bay (e.g., 132) within which the electronic module 300 is configured to be installed. The electronic module 300 can include a release member (not shown) at least partially housed within the module housing 302 that is configured to releaseably engage the retention member 140. The retention member can be configured to engage the electronic module 300 so as to couple the first portion associated with the first end 310 of the electronic module 300 to the frame 102. For example, the release member can be movable relative to the retention member 140 between a locked position, wherein the retention member 140 is configured to engage the release member so as to retain at least a first portion (e.g., associated with the first end 310) of the electronic module 300 within a bay (e.g., bay 132), and an unlocked position, wherein the release member is disengaged from the retention member 140 to allow at least the first portion of the electronic module 300 to move away from (e.g., rotate away from) the floor 202 of the bay. By way of example, the retention member 140 can include a projection or rib extending outwardly from the floor or bottom wall of the respective bay (e.g., 132) and/or the release member can correspond to a hook-like member at least partially housed within the electronic module housing. The retention member 140 can define one or more opening(s) or slot(s) configured to receive a portion of the release member when the release member is moved to its locked position. Similarly, the retention member 140 can be disengaged from the electronic module's release member to allow at least one end (e.g., first end 310) of the electronic module to move away from (e.g., rotate away from) the floor 202 of the bay (e.g., 132) and be subsequently removed from its corresponding bay (e.g., 132). For example, disengagement and/or ejection from the retention member 140 can be activated by electromechanical actuation.

Additionally, and/or alternatively, at least one portion of the electronic module 300 can be configured to engage the connector 150. For instance, a second portion associated with second end 312 can include means to engage the connector 150. The electronic module 300 can include a module opening 322 at the second end 312. The module opening 322 can be defined by interior module walls 324A-C. In some implementations, the module opening 322 can be configured to fit the connector 150, for example, such that the outer housing 204 is positioned within the module opening 322 when the electronic module 300 is installed in the bay 132. For instance, the size and shape of the module opening 322 can be such that at least a portion of the connector 150 can be positioned in the module opening 322.

The electronic module 300 can include means to electrically contact the data connection interface(s) 210 of the modular electronic device 100. For instance, the electronic module 300 can include one or more data connection interface(s) 326 (e.g., including one or more communication elements). The data connection interface(s) 326 can be positioned within module opening 322. The data connection interface(s) 326 can be configured such that when the electronic module 300 is installed in bay 132 and engages the connector 150, the data connection interface(s) 326 of the electronic module 300 can be configured to engage with the corresponding data connection interface(s) 210 of the electronic modular device 100 (e.g., associated with connector 150) to form a plurality of electrical contacts over which data and/or power can be transferred according to various techniques.

The electronic module 300 can include means to engage with the connector 150 of the electronic modular device 100. For instance, the modular electronic device 300 can include one or more engagement member(s) 328. In some implementations, the engagement member(s) 328 can be positioned within the module opening 322. The engagement member(s) 328 can be positioned on one or more of the interior module walls 324A-C. For example, an engagement member 328 can be positioned adjacent to and/or in contact with interior wall 324C. Additionally, and/or alternatively, an engagement member 328 can positioned adjacent to and/or in contact with interior wall 324A.

The engagement member(s) 328 can be made of a material of sufficient rigidity and strength to support any static and/or dynamic loads (e.g., forces, torques, tensions, compressions, etc.) imparted on engagement member(s) 328 while the electronic module 300 is in use. The engagement member(s) 328 can, for example, be made of polymer, metal, composite, some combination thereof, and/or any other suitable material. The strength and/or rigidity of the material may enable engagement member(s) 328 to temporarily deform in a manner that is suitable for its engagement and/or disengagement functions, as further described herein.

Figure 4A:
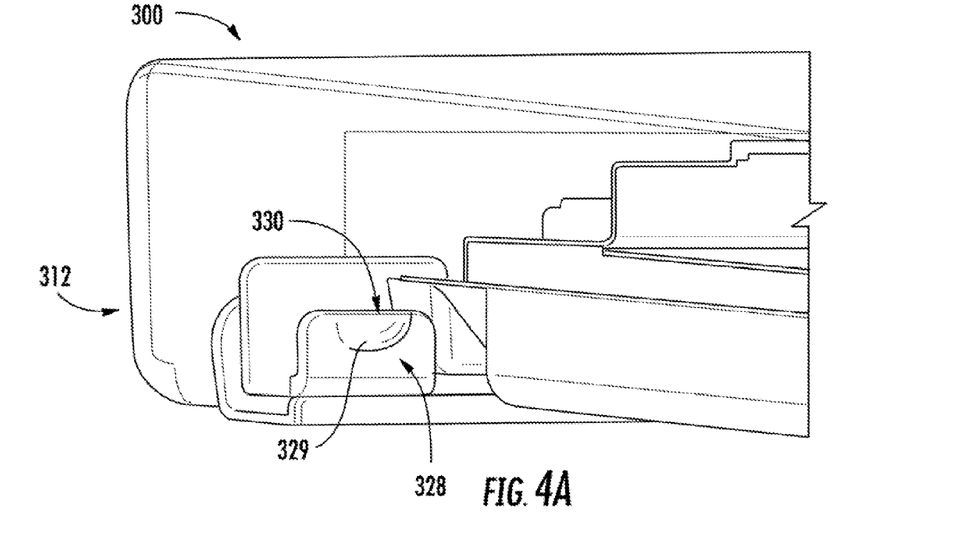
FIGS. 4A-B each depict a view of a portion of an example electronic module according to example embodiments of the present disclosure.
Figure 4B:
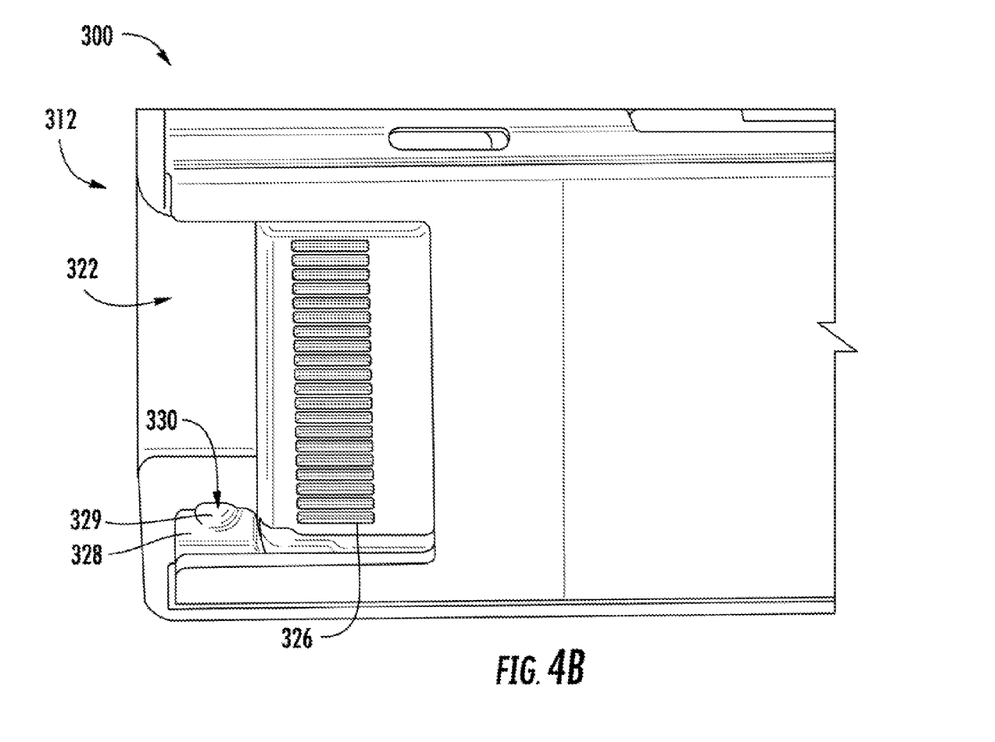

The shape of the engagement member(s) 328 can be configured to facilitate secure attachment of the electronic module 300 to the electronic modular device 100. FIGS. 4A-B depict a view of the second end 312 of the electronic module 300 according to example embodiments of the present disclosure. As shown in FIGS. 4A-B, in some implementations, the engagement member(s) 328 can include at least a partially spherical shape (e.g., half-dimple shape). The engagement member(s) 328 can include a protruding portion 329 that can be configured to deform during engagement and/or disengagement with the connector 150, as further described below. Additionally, and/or alternatively, the engagement member(s) 328 can include an upper edge portion 330 that can be configured to interface with at least a portion of the connector 150 (e.g., engagement portion 211) when the electronic module 300 is engaged with the connector 150, as further described below.

The connector 150 can be configured to engage with the electronic module 300 to couple a second portion associated with the second end 312 of the electronic module 300 to the frame 102. The engagement member(s) 328 can be configured to engage at least a portion of the connector 150 to temporarily secure at least a portion of the electronic module (e.g., the second portion associated with the second end 312) to the modular electronic device 100 and/or the connector 150. For instance, FIGS. 5A-D depict a schematic of the electronic module 300 in various positions relative to the connector 150 according to example embodiments of the present disclosure.

Figure 5A:
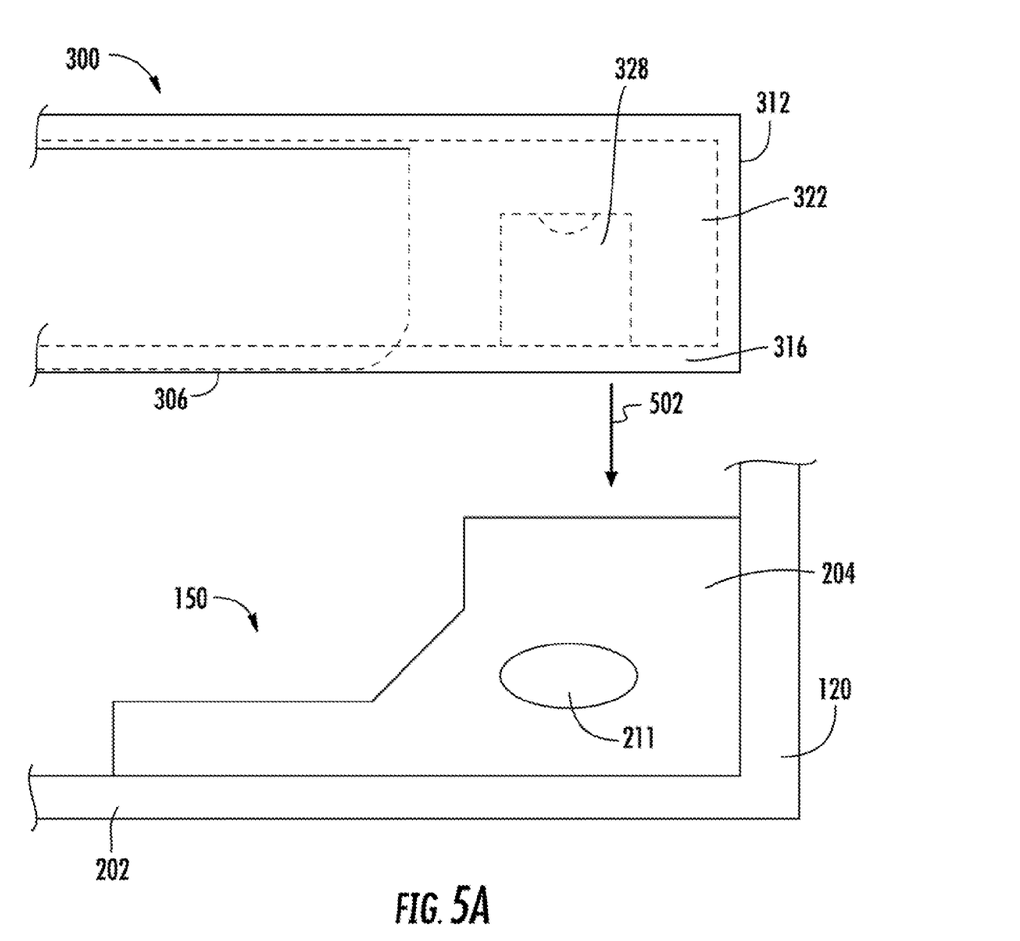
FIGS. 5A-D depict schematics of an example electronic module in various positions relative to an example connector according to example embodiments of the present disclosure.

In FIG. 5A, at least a second portion of the electronic module 300 (e.g., the portion associated with the second end 312) can be positioned to engage with the connector 150. For example, the electronic module 300 can move in a direction towards the connector 150 (e.g., in the direction of arrow 502). The outer housing 204 of the connector 150 can be configured to fit within the module opening 322, as the electronic module 300 is positioned over the connector 150. As the electronic module 300 generally moves toward the connector 150, the engagement member(s) 328 can contact the outer housing 204 of the connector 150. In some implementations, the engagement member(s) 328 can deform in a manner such that at least a portion of the engagement member(s) 328 is forced away from the outer housing 204 of the connector 150, while still providing a force to the connector 150. The electronic module 300 can move toward the connector 150 such that the engagement member(s) 328 of the electronic module 300 can be engaged with (e.g., positioned within) the engagement portion 211 of the connector 150. The shape, size, configuration, etc. of the electronic module 300 (and/or the connector 150) can allow for generally vertical insertion of the module over the connector 150.

Figure 5B:
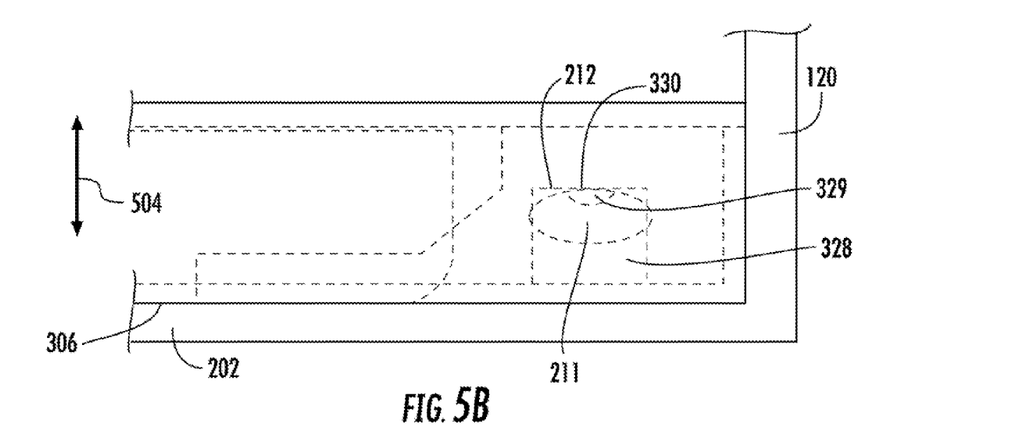

FIG. 5B depicts the electronic module 300 in an engagement position relative to the connector 150. In the engagement position, the electronic module 300 can be engaged with the connector 150. The connector can be configured to engage with the electronic module 300 to couple a second portion associated with the second end 312 of the electronic module 300 to the frame 102. For instance, the engagement member(s) 328 of the electronic module 300 can be configured to engage with the engagement portion 211 of the connector 150 to secure and/or couple at least a portion of the electronic module 300 (e.g., the portion near the second end 312) to the modular electronic device 100 and/or the connector 150. The engagement member(s) 328 can be positioned within the engagement portion 211, as shown.

The upper edge portion 330 of the engagement member(s) 328 can be configured to interface with the inner surface 212 of the engagement portion 211 of the connector 150. For instance, the upper edge portion 330 of the engagement member(s) 328 can contact the inner surface 212 to secure the electronic module 300 to the electronic modular device 100 by limiting movement of the electronic module 300 while the electronic module 300 is engaged with the connector 150 and/or installed within the bay 132. Contact between the upper edge portion 330 and the inner surface 212 can limit (e.g., to a de minimis level, prevent, etc.) movement of at least a portion of the electronic module 300

(e.g., associated with the second end 312) in a direction that is generally away from at least a portion of the frame 102 (e.g., generally in the direction of arrow 504 shown in FIG. 5B). In this way, the engagement member(s) 328 can be configured to engage with the engagement portion 211 to prevent the electronic module 300 from falling out of the bay 132 during a vibration, a drop, etc. of the electronic modular device 100, etc.

As shown, while in the engagement position, the connector 150 (e.g., including its outer housing 204) can be positioned within the module opening 322. The second end 312 of the electronic module 300 can be positioned adjacent to (and/or in contact with) a wall (e.g., rear wall 120). The lower wall 306 of the electronic module 300 can be positioned adjacent to (and/or in contact with) the floor 202 of a bay (e.g., bay 132). Additionally, and/or alternatively, while in the engagement position, the data connection interface(s) 326 of the electronic module 300 can contact the data connection interface(s) 210 of the electronic modular device 100. In this way, the electronic module 300 and the electronic modular device 100 can transfer data and/or power between them.

Figure 5C:
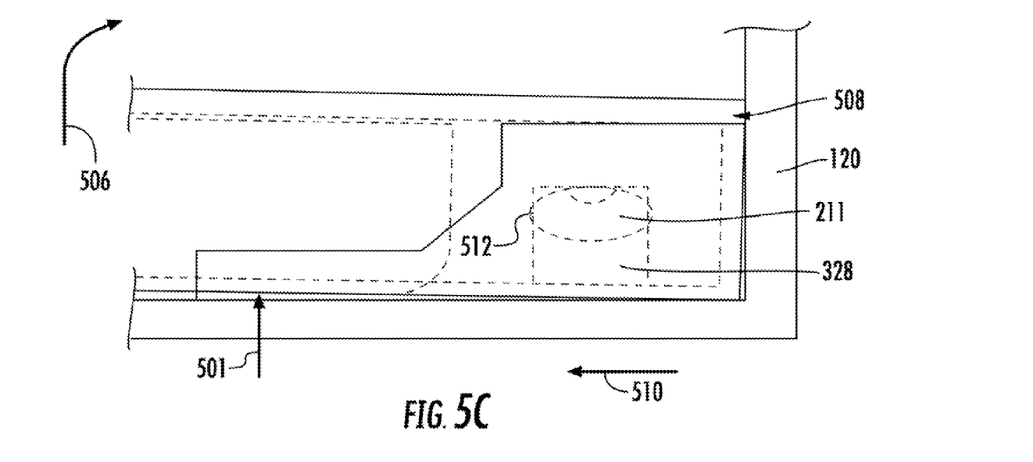
Figure 5D:
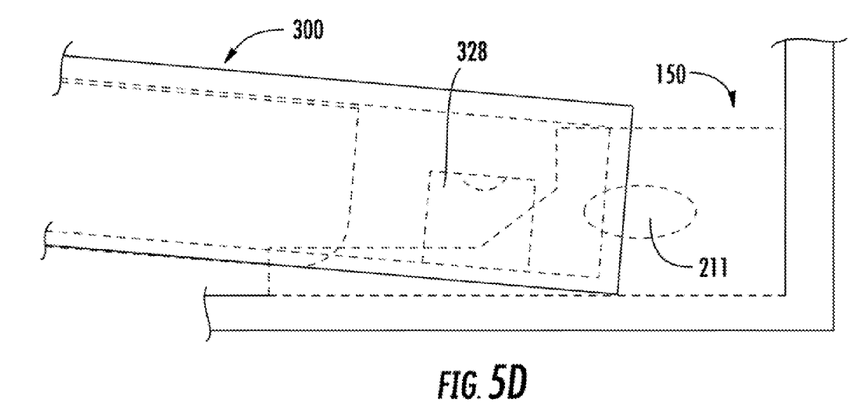

FIG. 5C depicts the portion of the electronic module 300 associated with the second end 312 after the electronic module 300 has been ejected/released from the retention member(s) 140. Upon such release (e.g., due to mechanical release, electromechanical actuation, etc.), the electronic module 300 can be configured to rotate (e.g., generally in the direction of the arrow 506). In some implementations, the element(s) 209 (not shown in FIG. 5C) can be configured to provide a force 501 to the electronic module 300 to facilitate such rotation of the electronic module 300. The electronic module 300 can be configured to pivot about the engagement member(s) 328 as it rotates. Additionally, and/or alternatively, the engagement member(s) 328 can be configured to allow for the electronic module 300 to be retained upon ejection of the electronic module 300 from the retention member(s) 140. For example, in the event that the modular electronic device 100 is turned upside-down after ejection from the retention member(s) 140 (but before disengagement of the engagement member(s) 328) the electronic module 300 will remain engaged with the connector 150 (e.g., will not fall out) even though the portion of the electronic module 300 has been released from the retention member(s) 140.

At least a portion of the frame 102 can be configured to provide a force to the electronic module to facilitate the disengagement of the electronic module 300 from the modular electronic device 100. For instance, a wall (e.g., rear wall 120) can be configured to provide a force 508 to the second end 312, as the electronic module 300 rotates (e.g., generally in the direction of arrow 506). Application of the force 508 can cause the electronic module 300 to move in a lateral direction (e.g., generally in the direction of arrow 510).

The electronic module 300 can be configured to disengage from the connector 150. For example, upon rotation of the electronic module 300 and/or application of the force 508 (e.g., as a user pulls up on the electronic module 300), the engagement member(s) 328 can move in a lateral direction (e.g., generally in the direction of arrow 510). The engagement member(s) 328 can be configured to disengage (e.g., move to a position not in contact with) from the engagement portion 211 of the connector 150 by moving past a front surface 512 of the engagement portion 211. In some implementations, the engagement member(s) 328 can be configured to temporarily deform as it becomes disengaged with the engagement portion 211 to facilitate the removal of the electronic module 300. As the electronic module 300 moves laterally it can be disengaged from the connector 150 (and/or the electronic modular device 100), as shown for example in FIG. 5D. In this way, a user can remove the electronic module 300 from the frame 102 of the modular electronic device 100.

Figure 6:
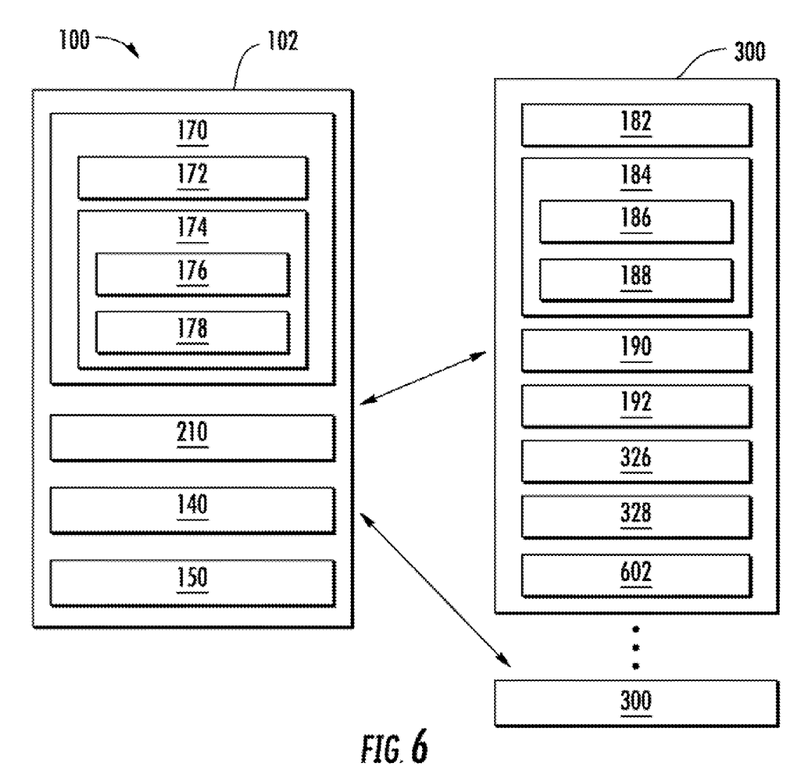
FIG. 6 depicts a block diagram of one embodiment of various components that can be included within an example modular electronic device according to example embodiments of the present disclosure.

Referring now to FIG. 6, a block diagram of one embodiment of various components that can be included within the modular electronic device 100 is depicted according to example embodiments of the present disclosure. As indicated above, the modular electronic device 100 may include a frame 102 and a plurality of electronic modules configured to be installed on the frame 102. For purposes of illustration, only two of the electronic modules 300 have been shown in FIG. 6. However, the modular electronic device 100 can include any number of electronic modules configured to be installed along the rear side (and/or the front side) of the frame 102. Similarly, the number of electronic modules included within the modular electronic device 100 can change over time as modules are swapped in and out of the frame 102.

As shown in FIG. 6, the frame 102 can include a frame controller 170. In general, the frame controller 170 can include one or more processor(s) 172 and one or more memory device(s) 174. The processor(s) 172 can be any suitable processing device, such as a microprocessor, microcontroller, integrated circuit, or other suitable processing device. Similarly, the memory device(s) 174 can include any suitable computer-readable medium or media, including, but not limited to, non-transitory computer-readable media, RAM, ROM, hard drives, flash drives, or other memory devices. The memory device(s) 174 can generally store information accessible by the processor(s) 172, including instructions 176 that can be executed by the processor(s) 172 and data 178 that can be retrieved, manipulated, created, or stored by the processor(s) 172. In several embodiments, the data 178 can be stored in one or more databases.

For example, the memory device(s) 174 can store a module/bay mapping database that stores data that maps or logically associates the various electronic modules of the device 100 with the corresponding bays in which they are received. Thus, the module/bay mapping data may serve as a roster that maps installed modules to the bays in which they are respectively received. In such an embodiment, the frame controller 170 may update the module/bay mapping whenever an electronic module is inserted or removed from the frame 102, and/or on a periodic basis.

In addition, as indicated above, the frame 102 may also include one or more data connection interface(s) 210 that communicatively couples the plurality of electronic modules to the frame controller 170 for transferring data and/or power between the frame 102 and an electronic module. As one example, the frame 102 may include at least one data connection interface(s) 210 in each of the plurality of bays (e.g., associated with the connector 150). The data connection interface(s) 210 may provide bi-directional communications between the frame controller 170 and each electronic module via one or more electrical, magnetic (e.g., inductive), or optical couplings between the data connection interface(s) 210 and the corresponding module (e.g., with a complementary data connection interface 326 of the electronic module 300). As an example, the data connection interface(s) 210 of each bay and/or connector 150 can include a number of complementary pairs of prongs, pins, contacts, or the like to form a number of serial data connections or other forms of data connection. In other implementations, the data connection interface(s) 210 of the frame 102 may perform wireless communication with one or more of the electronic modules (e.g., according to a short-range wireless communications protocol such as Bluetooth).

Moreover, the frame 102 can also include one or more retention/release and/or engagement features that facilitate retaining each module relative to the frame 102 and/or removing each module from the frame 102. For example, as indicated above, the frame 102 can, in some implementations, include a retention member 140 associated with the frame 102 (e.g., provided in each bay). The retention member 140 can be configured to engage the electronic module 300 to secure at least a portion of the electronic module 300 to the frame 102. Additionally, and/or alternatively, as described herein, the frame 102 can include one or more connector(s) 150 associated with the frame 102. The connector(s) 150 can be configured to engage with the electronic module 300 to secure at least a portion of the electronic module 300 to the frame 102. By way of example, the connector(s) 150 can be configured to engage with the electronic module 300 to couple a second portion associated with the second end 312 of the electronic module 300 to the frame 102. As indicated above, data connection interface(s) 210 of the frame 102 can be included and/or associated with the connector(s) 150.

Referring still to FIG. 6, in some implementations, the electronic module 300 can include one or more processor(s) 182 and one or more memory device(s) 184. As is generally understood, the processor(s) 182 and the memory device(s) 184 may be supported on a printed circuit board of each module. The processor(s) 182 can be any suitable processing device, such as a microprocessor, microcontroller, integrated circuit, or other suitable processing device. Similarly, the memory device(s) 184 can include any suitable computer-readable medium or media, including, but not limited to, non-transitory computer-readable media, RAM, ROM, hard drives, flash drives, or other memory devices. The memory device(s) 184 can generally store information accessible by processor(s) 182, including instructions 186 that can be executed by processor(s) 182 and data 188 that can be retrieved, manipulated, created, or stored by processor(s) 182. In several embodiments, the data 188 may be stored in one or more databases.

It should be appreciated that, in some implementations, the electronic module 300 may not include a processor. Instead, the memory device(s) 184 may store computer-readable instructions 186 that are configured to be executed by the frame controller 170. In such implementations, execution of the instructions 186 stored in the memory device(s) 184 by the frame controller 170 may enable the functionality provided by the individual electronic module.

The electronic module 300 can include an output component 190 configured to perform an output function, such as, for example, outputting light, images, sound and/or haptic feedback. As examples, the output component 190 may include a speaker, a visual battery life indicator, a front- or rear-facing display, a wireless communications interface (e.g., a wireless network radio), a flashlight, or various other components that output light, images, sound, or haptic feedback.

In some implementations, the electronic module 300 can include a data collection component 192. In general, the data collection component 192 can include any component, sensor, device, etc. that collects or generates data indicative of a physical condition. As examples, the data collection component 192 can include a pulse monitor, an oxygen level monitor, a glucose monitor, a credit card reader, a camera, a microphone, and/or various other types of sensors that collect data about a physical condition.

Referring still to FIG. 6, the electronic module 300 can include one or more data connection interface(s) 326, as described herein. In several embodiments, the data connection interface(s) 326 for the electronic module 300 can be the same as, similar to, or complementary to the data connection interface(s) 210 described above with reference to the frame 102. For example, the data connection interface(s) 326 can include a number of prongs, pins, or other electrical connections that are designed to mate with complementary connections at the data connection interface(s) 210 of the frame 102. The one or more data connection interface(s) 326 can transfer at least one of data and/or power between the electronic module 300 and the frame 102.

The electronic module 300 can include means to secure at least a portion of the electronic module 300 to the frame 102. For example, as described herein, the electronic module 300 can include one or more engagement member(s) 328 that can be, for example, provided on a portion of the module housing associated with the second end 312. The engagement member(s) 328 can be configured to engage with the frame 102 (e.g., the connector 150) of the modular electronic device 100 to secure and/or couple at least a portion (e.g., a second portion) of the electronic module 300 to the electronic modular device 100.

Additionally, and/or alternatively, the electronic module 300 can include one or more retention/release features that facilitate retaining each module relative to the frame 102 and/or removing each module from the frame 102. For example, as indicated above, the electronic module 300 can include a release member 602 that is configured to engage the corresponding retention member 140 provided in the bay in which the module is being installed. The engagement member(s) 328 can permit the electronic module 300 to remain connected to the frame 102 (e.g., connector 150) even upon release of a release member 602 from a retention member 140, as described herein.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A modular electronic device, comprising:
   a frame defining one or more bays, the frame adapted to respectively receive an electronic module in at least one of the bays; and
   a connector associated with the frame, the connector configured to engage with the electronic module to secure at least a portion of the electronic module to the frame and to permit the electronic module to be pivotably connected to the connector.

2. The modular electronic device of claim 1, wherein the one or more bays comprise a first bay and wherein the connector is situated within the first bay.

3. The modular electronic device of claim 1, wherein the connector comprises an engagement portion that is configured to engage with an engagement member of the electronic module to couple at least a portion of the electronic module to the connector.

4. The modular electronic device of claim 3, wherein the engagement portion of the connector comprises a cavity in the connector, wherein the engagement member of the electronic module is to be positioned within the cavity in the connector when the electronic module is in an engagement position.

5. The modular electronic device of claim 3, wherein the engagement portion of the connector comprises an inner surface that is to interface with an upper edge portion of the engagement member to limit movement of the electronic module.

6. The modular electronic device of claim 3, wherein the engagement portion of the connector is an elliptical shape.

7. The modular electronic device of claim 1, wherein the connector comprises one or more data connection interfaces to transfer at least one of data and power between the frame and the electronic module.

8. The modular electronic device of claim 1, wherein the connector comprises one or more spring-like elements configured to provide a force on the electronic module in a direction that is generally away from a floor of the at least one bay of the frame.

9. The modular electronic device of claim 1, further comprising:
   a retention member associated with the frame, the retention member is configured to engage the electronic module to secure at least another portion of the electronic module to the frame.

10. The modular electronic device of claim 9, wherein the electronic module comprises a first end and a second end, and
    wherein the retention member is configured to engage the electronic module so as to couple a first portion associated with the first end of the electronic module to the frame, and
    wherein the connector is configured to engage with the electronic module to couple a second portion associated with the second end of the electronic module to the frame.

11. The modular electronic device of claim 10, wherein the connector is configured to remain coupled to the electronic module upon release of the electronic module from the retention member.

12. An electronic module, comprising:
    a module housing that comprises a first end and a second end;
    an engagement member that is provided on a portion of the module housing associated with the second end, the engagement member configured to engage with a frame of a modular electronic device to secure at least the portion of the electronic module to the electronic modular device, wherein the engagement member comprises a protruding portion and an upper edge surface portion.

13. The electronic module of claim 12, wherein the engagement member is configured to engage with an engagement portion of a connector of the electronic modular device to couple at least the portion of the electronic module to the connector.

14. The electronic module of claim 12, wherein the protruding portion of the engagement member is positioned within the engagement portion of the electronic module when the electronic module is in an engagement position.

15. The electronic module of claim 12, wherein the upper edge portion of the engagement member contacts an inner surface of the engagement portion of the electronic module when the electronic module is in an engagement position to limit movement of the electronic module relative to the frame.

16. The electronic module of claim 12, wherein the engagement member comprises a partially-spherical shape.

17. The electronic module of claim 12, wherein the engagement member comprises a half-dimple shape.

18. The electronic module of claim 12, further comprising:
    one or more data connection interfaces to transfer at least one of data and/or power between the electronic modular device and the frame.

19. An electronic modular device, comprising:
    a frame defining one or more bays, the frame adapted to respectively receive an electronic module in at least one of the bays;
    a connector associated with the frame, the connector configured to engage with the electronic module to secure at least a portion of the electronic module to the connector; and
    an electronic module comprising
       a module housing comprises a first end and a second end, and
       an engagement member that is provided on a portion of the module housing associated with the second end, the engagement member configured to engage with the connector to secure at least the portion of the electronic module to the frame, and wherein the connector is configured to permit the electronic module to be pivotable connected to the connector via the engagement member.

* * * * *